United States Patent [19]

Parker

[11] Patent Number: 5,614,963
[45] Date of Patent: Mar. 25, 1997

[54] SUN SHIELD SYSTEM FOR PROTECTING THE EYES FROM UV AND INFRARED COMPONENTS OF SUNLIGHT

[76] Inventor: Cary D. Parker, 245 E. 25th St., Apt. 10-J, New York, N.Y. 10010

[21] Appl. No.: 528,613

[22] Filed: Sep. 15, 1995

[51] Int. Cl.⁶ .................. G02C 9/00; G02C 7/10; G02C 7/08
[52] U.S. Cl. .................. 351/47; 351/44; 351/57; 2/13
[58] Field of Search .................. 351/44, 47, 48, 351/57, 58, 41, 158; 2/10, 12, 13

[56] References Cited

U.S. PATENT DOCUMENTS

| | | | |
|---|---|---|---|
| 3,171,869 | 3/1965 | Weinberg | 264/1 |
| 3,195,145 | 7/1965 | Tisher et al. | 351/159 |
| 3,226,729 | 1/1966 | Fucci | 2/12 |
| 3,932,031 | 1/1976 | Johnston | 351/47 |
| 4,543,667 | 10/1985 | Garbutt | 2/13 |
| 4,577,942 | 3/1986 | Frieder et al. | 351/159 |
| 4,719,248 | 1/1988 | Bambury et al. | 523/108 |
| 4,842,400 | 6/1989 | Klein | 351/158 |
| 4,877,320 | 10/1989 | Holden | 351/44 |
| 4,878,748 | 11/1989 | Johansen et al. | 351/44 |
| 4,952,043 | 8/1990 | Werner et al. | 351/47 |
| 5,106,179 | 4/1992 | Kamaya et al. | 351/158 |
| 5,229,796 | 7/1993 | Nitta | 351/47 |
| 5,321,443 | 6/1994 | Huber et al. | 351/47 |

*Primary Examiner*—Hung X. Dang
*Attorney, Agent, or Firm*—Richard L. Miller, P.E.

[57] ABSTRACT

An eyeglass system comprising sunglasses or prescription eyeglasses and a detachable ultraviolet, infrared sun shield in one combined unit. The present invention is particularly directed towards a lightweight sun shield system for people who wear prescription eyeglasses. The sun shield component attaches to a slightly modified standard-style eyeglass frame (which thus can be fitted with standard size and shape prescription lenses) and provides further protection against ultraviolet and infrared rays as well as some protection from dust, debris, etc.

8 Claims, 2 Drawing Sheets

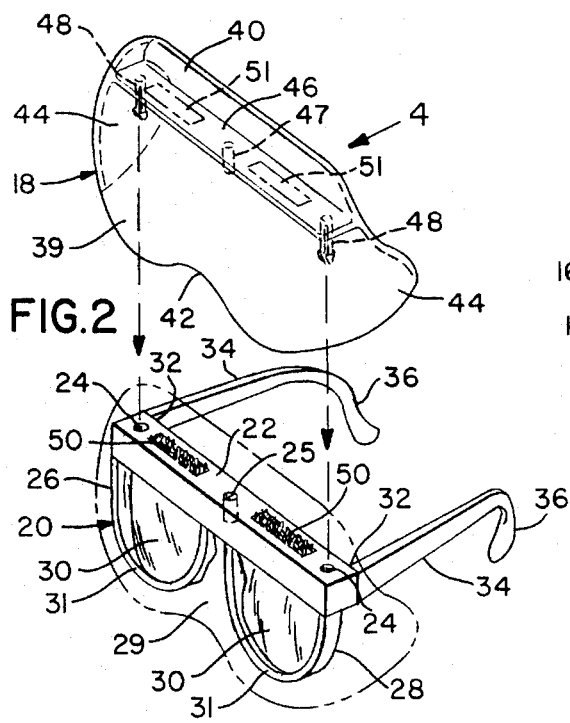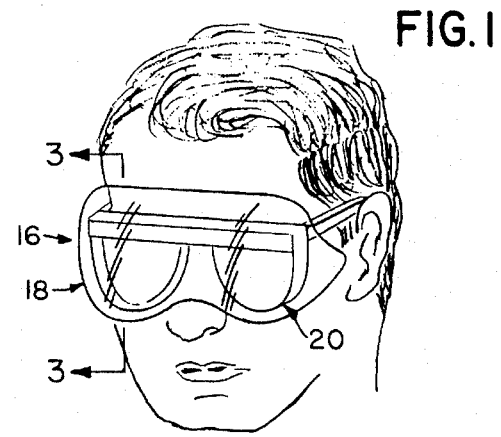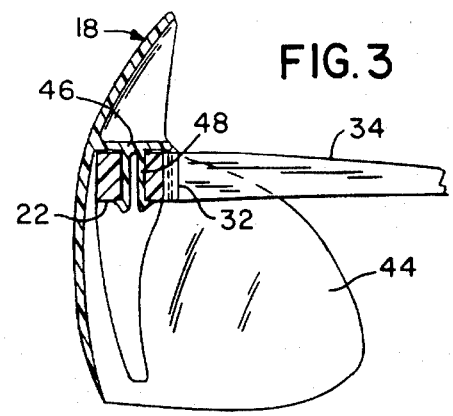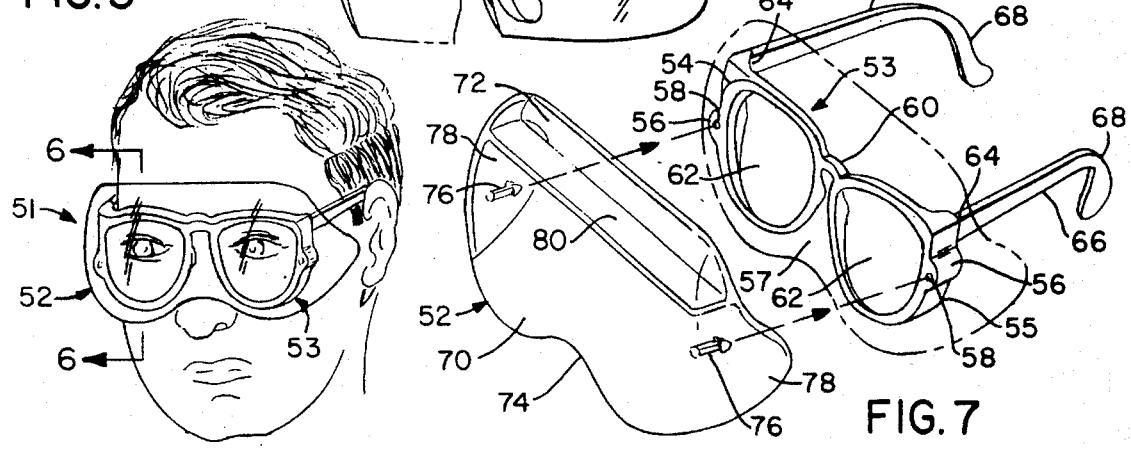

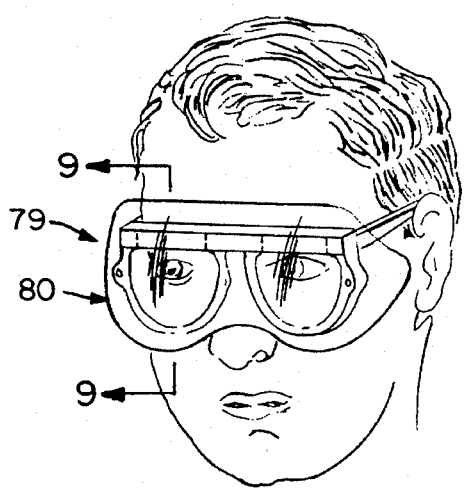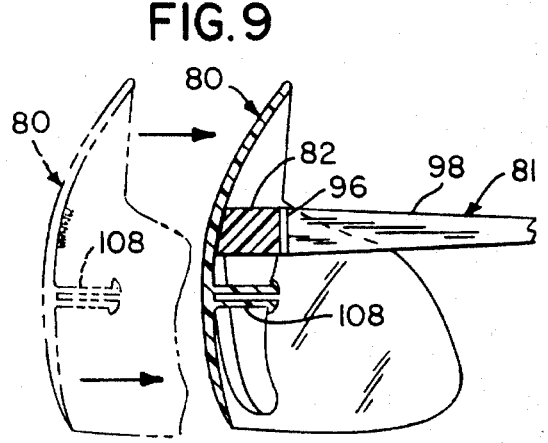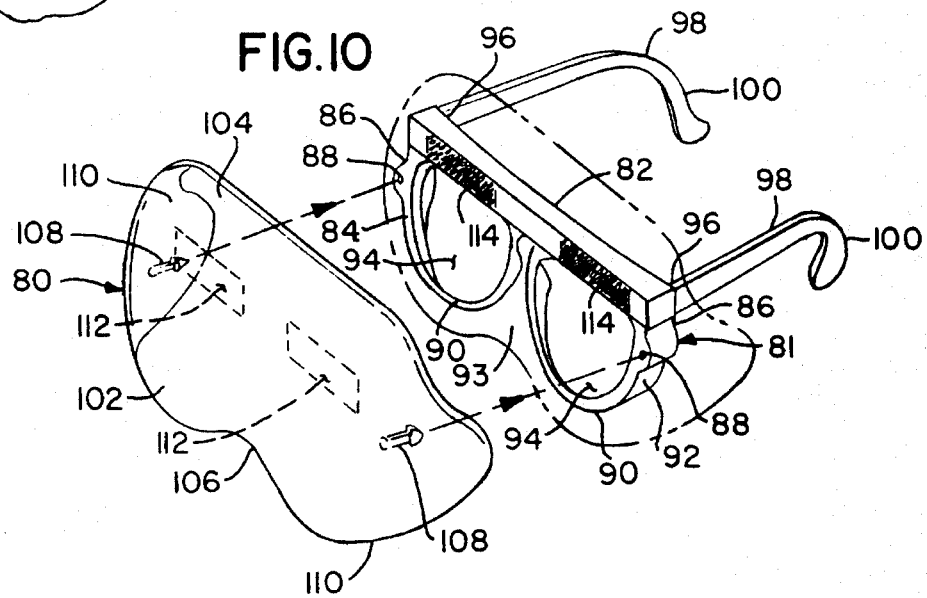

SUN SHIELD SYSTEM FOR PROTECTING THE EYES FROM UV AND INFRARED COMPONENTS OF SUNLIGHT

BACKGROUND OF THE INVENTION

The instant invention relates to eyeglasses in general and more specifically to eyeglass attachments that form a single functional unit with sunglasses or prescription glasses. The present invention is particularly directed towards a lightweight sun shield system for people who wear prescription eyeglasses. The sun shield component attaches to a slightly modified standard-style eyeglass frame (which thus can be fitted with standard size and shape prescription lenses) and provides further protection against ultraviolet and infrared rays as well as some protection from dust, debris, etc.

DESCRIPTION OF RELATED ART

Many attempts have been made to provide convenient to wear and use sun shields which will attach to conventional prescription eyeglasses to provide protection from the ultraviolet (UV) and infrared rays from the sun.

U.S. Pat. No. 3,171,869 to Weinberg describes a technique for making curved optical lenses. A curved eyeglass lens with UV-blocking/sun-glass properties can provide additional protection to the eyes. However, the technique is complex and requires an advanced process. Additionally, the curved lens would require new, more complex frame designs to mount the lenses. The curvature posteriorly adds another variable dimension to frame design and measurement.

U.S. Pat. No. 3,195,145 to Tisher et al provides a two lens system of a major protective lens and a smaller corrective lens. Significant features are that the corrective lens is mounted to fittings on the inner surface of the protective lens. The lens is fit into position with a heating technique. Optical properties are incorporated into the protective lens specific to the corrective lens used. Features for clasping a particular type corrective lens are designed into the corresponding protective lens.

With his invention, Tisher's goal is to optimize optical clarity, to create impact resistance to physical trauma, and to create a tight seal between the lenses which will prevent dirt and fluid contamination. He also wants his "spectacle lens system" to resemble everyday non-corrective sunglasses.

Although Tisher's device may reduce contamination between the tight-fitting lenses, his device is not readily dissembled when cleaning is required. More significant is that the corrective lens must be made specifically for this system. It must be made to fit into the mounting on the protective lens (which must also be made to match the type of corrective inner lens). The effort to manufacture this invention is refined, demanding, and somewhat complicated. Standardized frame sizes and current lens-making techniques can not be used to make Tisher's device. New lens-making technology is required. Since the lenses are substantially fixedly mounted into the outer shield, they can not be removed without access to a spanning wrench and a sand bath or heated air. Further Tisher's device offers virtually no ability to make available size and shape flexibility for individual variation.

U.S. Pat. No. 4,877,320 to Holden discloses eye-shielding glasses contoured to fit and completely cover the human eye area with a one-piece curved lens section provided with hinge-attached, removable temples. This invention offers the prescription lens wearer two pairs of eyeglasses worn simultaneously—i.e., one pair being worn over the other. This can be awkward, uncomfortable, unstable and so will not promote compliance with wearing a sun-shield.

U.S. Pat. No. 3,226,729 to Fucci discloses shields to be attached to the temple bars eyeglasses for protecting the eyes of the wearer from side lighting. Each shield comprises an elongated panel formed from a semi-rigid sheet material which is both transparent and tinted to filter out harmful components of the sun's rays. Since the shields must be attached to the temple bars before use, one must remember to carry them on one's person. Thus this is a three piece system which will quickly become tiring to assemble and use after a short time.

U.S. Pat. No. 3,932,031 to Johnston discloses a side shade attachable to the bow of a pair of spectacles and having a main portion hanging therebeneath but also a transverse shaped portion attached thereto and adapted to lap the adjacent side edge of a frame of the spectacles for preventing glare from coming to the wearer's eye from the area immediately rearward of the front of the spectacles. This is only a partial solution inasmuch as it does nothing to reduce UV and infrared radiation which enters through the lenses of the glasses to which the shades are attached.

U.S. Pat. No. 4,543,667 to Garbutt discloses a sun visor for attachment to a pair of eyeglass temples which includes a bill member having a flat, rigid stiffening member formed with a concave inner edge and a convex outer edge. Not directly covering the lenses of the glasses, this sun visor will only minimally reduce the UV and infrared radiation passing through the lenses of the glasses. This invention is primarily for reducing discomfort due to the glare from the sun.

None of these inventions provides a complete sunglass system for people who wear prescription eyeglasses. Further none of the background art inventions provides a combined sun shielding unit with a shield easily detachable from prescription eyeglasses, which shield is to provide enhanced UV and sun protection to the eye and proximal skin.

SUMMARY OF INVENTION, OBJECTS AND ADVANTAGES

Accordingly, the above mentioned problem is obviated by the present invention which provides a composite sunglass system for people who wear prescription eyeglasses. This system comprises a selection of substantially standard-size frames designed to accept a detachable sun shield. This sun shield is designed to provide enhanced UV and sun protection to the eye and proximal skin, over conventional, 'prescription' sunglasses. The shields also offer a sequence of contour size and fit. Since the sun shield is readily removable, cleaning is facilitated when needed. This sun shield and the standard frame and lens system allow immediate utilization. By using standardized frame sizes, present lens-making techniques can be used. These methods are in current widespread use in the art so this system can be used immediately at standard costs. No new lens-making technology is required. Further a selection of shields could be provided so that facial fit could be optimized.

Additionally having a detachable sun shield allows not only 'custom-fitting' the sun shield (by size and contour), but also the use of specialized shields (such as those for indoor and evening use). Since the eyeglass frame and detachable sun shield form a unit, the use of this unit is graceful, comfortable, stable, and conducive to continued use.

In particular when the instant invention is compared with the eyeglasses plus overglasses disclosed by the Holden patent, it can be seen that the one-piece composite unit of the instant invention is far less cumbersome and awkward to wear than eyeglasses plus overglasses. Especially when a doctor is prescribing a system with greater UV and sun protection, it can be seen that there will be greater compliance to the doctor's prescription by those who are to wear a one-piece system than by those who are to wear a two-piece system. Most people will find a two piece system very awkward to carry and to use. Further when the sun shield of the instant invention is removed from the eyeglasses, the result is a pair of virtually standard prescription eye glasses. And further, when the sun shield is upgraded as UV and other light-blocking materials and films improve, the upgraded sun shield can be used on the original eyeglass frame. Finally the sun shield is readily removable for thorough cleaning.

It is therefore an object of the present invention to provide a lightweight eyeglass sun shield to give better sun and UV protection for prescription eyeglass wearers.

A second object of this invention is to provide a lightweight sun shield which fits onto a substantially standard-style eyeglass frame which accepts standard prescription lenses.

A third object of this invention is to provide the eyeglass wearer with a single easy-to-carry and easy-to-use, comfortable, stable, one-piece functional unit—the eyeglasses and the sun shield forming one composite unit.

A fourth object of this invention is to provide a system which virtually becomes a standard pair of eyeglasses when the sun shield is removed.

A fifth object of this invention is to provide a sun shield which can easily be upgraded and used on the same frame as UV and other light-blocking materials and films improve.

A sixth object of this invention is to provide a sun shield which is readily removable without special tools so that it can easily be thoroughly cleaned.

A seventh object of this invention is to provide a sun shield with sufficient UV/sunlight blocking ability that no special UV/sunlight blocking quality need be built into the prescription lenses. And since the sun shield need not be designed to correct vision, the sun shield can be designed for optimum UV screening in terms of material and contouring around the face.

An eighth object of this invention is to provide a sun shield which fits over substantially conventional frames so that the frames can be sized to fit comfortably and securely for individual facial dimensions. The frame fits to the face, not the shield, and the shield fits to the frame. This allows a more precise alignment of the lens with the eye, which is critical in some prescriptions.

A ninth object of this invention is to provide a sun shield which can be made available in various sizes and contours to accommodate variations in facial shapes and taste and comfort, and the extent of shielding desired, thus allowing optimization of two aspects—frame fit and sun shield contour in one stable piece.

Further scope of applicability of the present invention will become apparent from the detailed description given hereafter. However, it should be understood that the drawings and the detailed description, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a diagrammatic perspective view illustrating a first embodiment of the instant invention in use.

FIG. 2 is a diagrammatic perspective exploded view thereof of the first embodiment per se.

FIG. 3 is a cross sectional view taken on line 3—3 of FIG. 1.

FIG. 4 is an elevational view taken in the direction of arrow 4 in FIG. 2 with parts broken away.

FIG. 5 is a diagrammatic perspective view illustrating a second embodiment of the instant invention in use.

FIG. 6 is a cross sectional view taken on line 6—6 of FIG. 5.

FIG. 7 is a diagrammatic perspective exploded view thereof of the second embodiment per se.

FIG. 8 is a diagrammatic perspective view illustrating a third embodiment of the instant invention in use.

FIG. 9 is a cross sectional view taken on line 9—9 of FIG. 8.

FIG. 10 is a diagrammatic perspective exploded view thereof of the third embodiment per se.

DESCRIPTION OF PREFERRED EMBODIMENT

Referring to the various drawings, the Sun Shield Eyeglass System is generally shown as numeral 16 in FIG. 1. FIG. 1 shows the instant invention in use.

FIG. 2 shows a first embodiment of the instant invention. Here the sun shield component (generally shown as numeral 18) is shown removed from the eyeglass component (generally shown as numeral 20). The eyeglass component 20 will be described first. The crosspiece 22 holds the left rim 26 and the right rim 28. Each rim has a substantially flat upper surface and a bowed lower section 31. The two rims are in a spaced apart arrangement with respect to each other such that the crosspiece 22 and the two rims 26, 28 define a space 29 for the nose of the wearer. At each end of the upper surface of the crosspiece 22 are apertures 24 which define a bore which runs from the upper surface to and through the lower surface of the crosspiece 22. In the middle of the upper surface of the crosspiece is a positioning hole 25 which mates with a positioning pin 47 on the sun shield 18 in order to assist in holding the sun shield 18 in proper relationship to the eyeglasses 20. Between the apertures 24 and the positioning hole 25 on the upper surface of the crosspiece are patches of mating hook and loop pile fastener material 50. Mounted within the left and right rims 26, 28 are corrective lenses 30, 30. Attached at each end of the crosspiece 22 are hinges 32 (better shown in FIG. 3). Attached to each hinge are temple pieces 34, 34 each of which terminates in an ear piece 36.

As is shown in FIG. 2, the sun shield 18 is elongated and curve-shaped and terminates at its upper edge in a widened overhang 40, and is narrowed centrally along its lower edge by a bridge opening 42, and terminates at its left and right edges in curved side shielding 44, 44. Attached to, running the full length from left to right of, and projecting from the inner upper portion of the sun shield 18 is a ledge 46. At each end of the lower surface of the ledge 46 are downwardly projecting bifurcated pin members 48, 48 positionally matching the apertures 24, 24 at the two ends of the upper surface of the eyeglass crosspiece 22. In the middle of the lower surface of the ledge 46 is a downwardly projecting positioning pin 47 which, as before mentioned, positionally matches the positioning hole 25 in the middle of the upper surface of the eyeglass crosspiece 22. On the lower surface of the ledge 46 between each of the bifurcated pin members 48 and the positioning pin 47 are two patches of mating hook and loop pile fastener material 51 positionally matching the two sections of mating hook and loop pile fastener material on the upper surface of the eyeglass crosspiece 22.

FIG. 3 is a cross sectional view taken on line 3—3 of FIG. 1. FIG. 3 shows how a bifurcated pin member 48 secures the ledge 46 of the sun shield 18 to the crosspiece 22 of the eyeglasses. FIG. 3 also shows the hinge 32 which joins the temple piece 34 to the crosspiece 22 of the eyeglasses.

FIG. 4 shows in greater detail the positioning pin 47 and the two patches of mating hook and loop pile fastener material 51.

To remove the sun shield 18 from the eyeglasses 20, one would squeeze together the two prongs at the forked end of each of the two bifurcated pin members 48 and push the forked ends back through the apertures 24 in the crosspiece 22 of the eyeglasses.

FIG. 5 is a diagrammatic perspective view illustrating a second embodiment of the instant invention in use. In FIG. 5, the Sun Shield Eyeglass System is generally shown as numeral 51. In FIG. 7 the sun shield component (generally shown as numeral 52) is shown removed from the eyeglass component (generally shown as numeral 53). The eyeglass component 53 will be described first. The bridge 60 holds the left rim 54 and the right rim 55 in a spaced apart arrangement with respect to each other such that the bridge 60 and the two rims 54, 55 define a space 57 for the nose of the wearer. At the left edge of the left rim 54 and the right edge of the right rim 55 are two protuberances 56. In each protuberance there is an aperture 58 defining a bore which runs from the front surface to and through the rear surface of the protuberance 56. Mounted within the left and right rims 54, 55 are corrective lenses 62, 62. Attached to the upper left edge and the upper right edge of the left and right rims respectively 54, 55 are hinges 64, 64 (better seen in FIG. 6). Attached to each hinge 64 are temple pieces 66, 66 each of which terminates in an ear piece 68.

As is shown in FIG. 7, the sun shield 52 is elongated and curve-shaped and terminates at its upper edge in a widened overhang 72, and is narrowed centrally along its lower edge by a bridge opening 74, and terminates at its left and right edges in curved side shielding 78, 78. The section of the sun shield between the two curved side shielding sections 78, 78 will be referred to as the lens section 70. Attached to, running the full length from left to right of, and projecting from the inner upper portion of the sun shield 52 is a ledge 80. Near the left and right ends of the lens section 70 on its inner surface are two outwardly projecting bifurcated pin members 76, 76 positionally matching the apertures 58, 58 in the two protuberances 56, 56 on the left and right rims 54, 55.

FIG. 6 is a cross sectional view taken on line 6-6 of FIG. 5. FIG. 6 shows how a bifurcated pin member 76 secures the sun shield 52 to the protuberances 56, 56 on the eyeglass rims. FIG. 6 also shows the hinge 64 which joins the temple piece 66 to the rim 54 of the eyeglasses.

To remove the sun shield 52 from the eyeglasses 53, one would squeeze together the two prongs at the forked end of each of the two bifurcated pin members 76, 76 and push the forked ends back through the apertures 58, 58 in the protuberances 56, 56 on the left and right rims of the eyeglasses.

FIG. 8 is a diagrammatic perspective view illustrating a third embodiment of the instant invention in use. In FIG. 8, the Sun Shield Eyeglass System is generally shown as numeral 79. In FIG. 10 the sun shield component (generally shown as numeral 80) is shown removed from the eyeglass component (generally shown as numeral 81). The eyeglass component 81 will be described first.

The crosspiece 82 holds the left rim 84 and the right rim 92. Each rim has a substantially flat upper surface and a bowed lower section 90. The two rims are in a spaced apart arrangement with respect to each other such that the crosspiece 82 and the two rims 84, 92 define a space 93 for the nose of the wearer. At the left edge of the left rim 84 and the right edge of the right rim 92 are two protuberances 86, 86. In each protuberance there is an aperture 88 defining a bore which runs from the front surface to and through the rear surface of the protuberance 86. On the front surface of the crosspiece are two patches of mating hook and loop pile fastener material 114, 114. Mounted within the left and right rims 84, 92 are corrective lenses 94, 94. Attached at each end of the crosspiece 82 are hinges 96 (better seen in FIG. 9). Attached to each hinge are temple pieces 98, 98 each of which terminates in an ear piece 100.

As is shown in FIG. 10, the sun shield 80 is elongated and curve-shaped and terminates at its upper edge in a widened overhang 104, and is narrowed centrally along its lower edge by a bridge opening 106, and terminates at its left and right edges in curved side shielding 110,110. The section of the sun shield between the two curved side shielding sections 110,110 will be referred to as the lens section 102. Near the left and right ends of the lens section 102 on its inner surface are outwardly projecting bifurcated pin members 108, 108 positionally matching the apertures 88, 88 in the two protuberances 86, 86 on the left and right rims 84, 92. On the inner surface of the lens section 102 are two patches of mating hook and loop pile fastener material 112,112 positionally matching the two sections of mating hook and loop pile fastener material 114,114 on the front section of the eyeglass crosspiece 82.

FIG. 9 is a cross sectional view taken on line 9—9 of FIG. 8. FIG. 9 shows how a bifurcated pin member 108 secures the sun shield 80 to the protuberances 86 (better shown in FIG. 10) on the eyeglass rims 84, 92. FIG. 9 also shows the hinge 96 which joins the temple piece 98 to the crosspiece 82 of the eyeglasses.

To remove the sun shield 80 from the eyeglasses 81, one would squeeze together the two prongs at the forked end of each of the two bifurcated pin members 108 and push the forked ends back through the apertures 88, 88 in the protuberances 86, 86 on the left and right rims 84, 92 of the eyeglasses.

It is contemplated that the Sun Shield Eye Glass Attachment will be offered in a variety of colors, surface textures, print designs, coverings (leather, vinyl, etc.) and lengths for various size heads.

CONCLUSION, RAMIFICATIONS, AND SCOPE OF INVENTION

From the foregoing, it will be seen that I have provided a Sun Shield Eye Glass System to protect the eyes of a person who ordinarily wears prescription eyeglasses from the harmful UV and infrared rays in sunlight.

Thus the reader will see that my invention supplies a long felt need for a comfortable, easy to use Sun Shield Eye Glass System which combines in one unified system the most desired qualities and characteristics required to protect the eyes of the wearer from the harmful effects of the UV and infrared components of sunlight. There are many variations of this Sun Shield Eye Glass Attachment which can be made by those skilled in the art without departing from the inventive concepts expressed herein. Accordingly, the scope of my invention should be determined not by the embodiments described, but by the appended claims and their legal equivalents.

The invention claimed is:

1. A sun shield system for protecting the eyes of the wearer from the harmful effects of the UV and infrared components of sunlight, comprising:
   (a) eyeglasses comprising:
      (i) a crosspiece having an upper surface, a lower surface, a left hand portion, a right hand portion, a left end, and a right end; said crosspiece further having apertures in its upper surface at its left end and its right end; said apertures forming a bore extending from the upper surface to the lower surface of the crosspiece;
      (ii) a left rim having a substantially flat upper surface with a left edge and a right edge; a right rim having a substantially flat upper surface with a left edge and a right edge; each of said rims having a bowed lower section; the left edge of the left rim being aligned with the left edge of the crosspiece and the right edge of the right rim being aligned with the right edge of the crosspiece; the left rim having its upper surface flush with, and fixedly attached to, the lower surface of the left hand portion of the crosspiece; the right rim having its upper surface flush with, and fixedly attached to, the lower surface of the right hand portion of the crosspiece; the two rims defining a space between them for the nose of the wearer;
      (iii) a corrective lens mounted in each rim;
      (iv) hinges attached to the left and right ends of the crosspiece; and
      (v) two temple pieces; each of said temple pieces having a nearer end and a further end; one temple piece being attached to each hinge at its nearer end; each of said temple pieces terminating at its further end in an earpiece for securing the eyeglasses to the ears of the wearer;
   (b) an elongated curve-shaped lens section made from specified materials having sun ray resistant coloring manufactured into its materials; said lens section further having an upper portion, a lower portion, a left hand portion, a right hand portion, an inner surface, and an outer surface, wherein the upper portion terminating in a widened overhang, the lower portion being narrowed centrally by a bridge opening, and both the left and right hand portions terminating in curved side shielding; the elongated curve-shaped lens section further comprising a ledge having an upper surface and a lower surface; said ledge projecting from the inner surface of said curve-shaped lens section for resting on the upper surface of the crosspiece of the eyeglasses; said ledge further having at each end of its lower surface a downwardly projecting bifurcated pin member for passing through the apertures at each end of the crosspiece and for securing the ledge to the crosspiece; and
   (c) means for securing the curve-shaped lens section to the eyeglasses.

2. The sun shield system of claim 1 wherein said one-piece curved lens section is fabricated from durable, high impact and mar resistant plastic.

3. The sun shield system of claim 2 wherein the crosspiece of the eyeglasses has at a plurality of positions along its upper surface, sections of a given length of mating hook and loop pile fastener material, and wherein the lower surface of the ledge of the lens section has mating pieces of mating hook and loop pile fastener material for removably attaching to the mating hook and loop pile fastener material along the upper surface of the crosspiece of the eyeglasses.

4. A sun shield system for protecting the eyes of the wearer from the harmful effects of the UV and infrared components of sunlight, comprising:
   (a) eyeglasses comprising:
      (i) a left rim having a front surface, a back surface, a right edge, and a left edge having a protuberance with an aperture therein which aperture forms a bore passing from the front surface to the back surface of the left rim; said eyeglasses further comprising a right rim having a front surface, a back surface, a left edge and a right edge having a protuberance with an aperture therein which aperture forms a bore passing from the front surface to the back surface of the left rim; each of said rims further having a bowed lower section, and a bridge joining the left rim at its right edge and the right rim at its left edge; the two rims with the bridge forming a space for the nose of a wearer;
      (ii) a corrective lens mounted in each rim;
      (iii) hinges attached to the two rims; and
      (iv) two temple pieces; each of said temple pieces having a nearer end and a further end; one temple piece being attached to each hinge at its nearer end; each of said temple pieces terminating at its further end in an earpiece for securing the eyeglasses to the ears of the wearer;
   (b) an elongated curve-shaped lens section made from specified materials having sun ray resistant coloring manufactured into its materials; said lens section further having an upper portion, a lower portion, a left hand portion, a right hand portion, an inner surface, and an outer surface, wherein the upper portion terminating in a widened overhang, the lower portion being narrowed centrally by a bridge opening, and both the left and right hand portions terminating in curved side shielding; the left and right hand portions of the elongated curve-shaped lens section each having on their inner surfaces an outwardly projecting bifurcated pin member for passing through the apertures in the protuberances in the rims of the eyeglasses for securing the sun shield to the eyeglasses; the elongated curve-shaped lens section further comprising a ledge having an upper surface and a lower surface; said ledge projecting from the inner surface of said curve-shaped lens section for resting on the upper surface of the rims of the eyeglasses; and
   (c) means for securing the curve-shaped lens section to the eyeglasses.

5. The sun shield system of claim 4, wherein said one piece curved lens section is fabricated from durable, high impact, and mar resistant plastic.

6. A sun shield system for protecting the eyes of the wearer from the harmful effects of the UV and infrared components of sunlight, comprising:
   (a) eyeglasses comprising:
      (i) a crosspiece having a front surface, an upper surface, a lower surface, a left hand portion, a right hand portion, a left end, and a right end;
      (ii) a left rim having a substantially flat upper surface with a right edge, a left edge having a protuberance with an aperture therein which aperture forms a bore passing from the front surface to the back surface of the left rim; a right rim having a substantially flat upper surface with a left edge, and a right edge having a protuberance with an aperture therein which aperture forms a bore passing from the front surface to the back surface of the right rim; each of said rims further having a bowed lower section; the left edge of the left rim being aligned with the left edge of the crosspiece and the right edge of the right rim being aligned with the right edge of the crosspiece; the left rim further having its upper surface flush with, and fixedly attached to, the lower surface of the left hand portion of the crosspiece; the right rim further having its upper surface flush with, and fixedly attached to, the lower surface of the right hand portion of the crosspiece; the two rims defining a space between them for the nose of the wearer;

(iii) a corrective lens mounted in each rim;

(iv) hinges attached to the left and right ends of the crosspiece; and (v) two temple pieces; each of said temple pieces having a nearer end and a further end; one temple piece being attached to each hinge at its nearer end; each of said temple pieces terminating at its further end in an earpiece for securing the eyeglasses to the ears of the wearer;

(b) an elongated curve-shaped lens section made from specified materials having sun ray resistant coloring manufactured into its materials; said lens section further having an upper portion, a lower portion, a left hand portion, a right hand portion, an inner surface, and an outer surface, wherein the upper portion terminating in a widened overhang, the lower portion being narrowed centrally by a bridge opening, and both the left and right hand portions terminating in curved side shielding; the left and right hand portions of the elongated curve-shaped lens section each having on their inner surfaces an outwardly projecting bifurcated pin member for passing through the apertures in the protuberances in the rims of the eyeglasses for securing the sun shield to the eyeglasses; and (c) means for securing the curve-shaped lens section to the eyeglasses.

7. The sun shield system of claim 6, wherein said one piece curved lens section is fabricated from durable, high impact, and mar resistant plastic.

8. The sun shield system of claim 6, wherein the crosspiece of the eyeglasses has at a plurality of positions along its front surface, sections of a given length of mating hook and loop pile fastener material, and wherein the curve shaped lens section has at positions along its inner surface matching pieces of mating hook and loop pile fastener material for removably attaching to the mating hook and loop pile fastener material along the front surface of the crosspiece of the eyeglasses.

* * * * *